(12) United States Patent
Eto et al.

(10) Patent No.: US 10,068,618 B2
(45) Date of Patent: Sep. 4, 2018

(54) ELECTRONIC APPARATUS AND HARD DISK DRIVE HOLDER

(71) Applicant: SONY INTERACTIVE ENTERTAINMENT INC., Tokyo (JP)

(72) Inventors: Kazutaka Eto, Tokyo (JP); Shinya Tsuchida, Tokyo (JP); Keiichi Aoki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/662,300

(22) Filed: Jul. 28, 2017

(65) Prior Publication Data

US 2018/0033464 A1    Feb. 1, 2018

(30) Foreign Application Priority Data

Jul. 29, 2016   (JP) .................................. 2016-150625

(51) Int. Cl.
| | |
|---|---|
| *G06F 1/16* | (2006.01) |
| *G11B 33/02* | (2006.01) |
| *G06F 1/18* | (2006.01) |
| *G11B 33/12* | (2006.01) |

(52) U.S. Cl.
CPC ............ *G11B 33/027* (2013.01); *G06F 1/181* (2013.01); *G06F 1/187* (2013.01); *G11B 33/022* (2013.01); *G11B 33/124* (2013.01)

(58) Field of Classification Search
None
See application file for complete search history.

(56) References Cited

U.S. PATENT DOCUMENTS

| | | | | |
|---|---|---|---|---|
| 6,580,607 B1 * | 6/2003 | Feldmeyer | ............. | G06F 1/184 |
| | | | | 361/679.36 |
| 8,064,196 B2 * | 11/2011 | Furuta | ................. | G11B 33/123 |
| | | | | 361/679.33 |
| 8,159,817 B2 * | 4/2012 | Lin | ........................ | G06F 1/187 |
| | | | | 312/223.1 |
| 8,310,827 B2 * | 11/2012 | Huang | .................... | G06F 1/187 |
| | | | | 312/223.2 |
| 2004/0076103 A1 * | 4/2004 | Drouin | ................ | G11B 25/043 |
| | | | | 720/600 |

FOREIGN PATENT DOCUMENTS

JP    2010-244214 A    10/2010

* cited by examiner

*Primary Examiner* — Anthony Q Edwards
(74) *Attorney, Agent, or Firm* — HEA Law PLLC

(57) ABSTRACT

Disclosed herein is an electronic apparatus including a main body, a compartment provided in the main body, a part that is accommodated in the compartment and that can be drawn out of the compartment, two attachment sections that are provided on the part and that are located away from each other, and a knob member attached to the two attachment sections. The knob member is a flexible member that is longer than a distance between the two attachment sections, includes a curved portion that is curved in such a manner as to swell in a direction away from the part, and is elastically deformable such that the swelling of the curved portion decreases.

8 Claims, 4 Drawing Sheets

ELECTRONIC APPARATUS AND HARD DISK DRIVE HOLDER

BACKGROUND

The present disclosure relates to a technology for facilitating removal of parts of an electronic apparatus that includes parts such as a hard disk drive that can be removed from a main body of the electronic apparatus.

Some electronic apparatuses such as gaming device and personal computer include parts that can be replaced by users and service personnel. For example, the electronic apparatus of Japanese Patent Laid-Open No. 2010-244214 (hereinafter referred to as Patent Document 1) has a hard disk drive as an example of such parts. The electronic apparatus of Patent Document 1 has a housing that accommodates a hard disk drive and circuit boards, and an opening is formed in this housing to draw out or insert the hard disk drive. A cover is attached to the housing to close the opening. The hard disk drive is held by a holder.

SUMMARY

If a knob section is provided on a removable part for a service personnel to pick up the part by, workability involved in removal can be improved. However, an electronic apparatus has a variety of parts in addition to the removable part. For this reason, it is necessary to provide a knob section on the removable part in such a manner as to avoid interference with other parts. As a result, it is occasionally difficult to determine a position and a shape of the knob section.

It is desirable to provide an electronic apparatus that permits a knob section to be provided on a replaceable part with ease and to provide a hard disk drive holder that permits a knob section to be provided on the hard disk drive holder with ease.

According to an embodiment of the present disclosure, there is provided an electronic apparatus that has a main body, a compartment, a part, two attachment sections, and a knob member. The compartment is provided in the main body. The part is accommodated in the compartment and can be drawn out of the compartment. The two attachment sections are provided on the part and are located away from each ether. The knob member is attached to the two attachment sections. The knob member is a flexible member that is longer than a distance between the two attachment sections. The knob member includes a curved portion that is curved in such a manner as to swell in a direction away from the part. The knob member is elastically deformable such that the swelling of the curved portion decreases. This electronic apparatus permits the knob member to be provided on the replaceable part with ease.

According to another embodiment of the present disclosure, there is provided a hard disk drive holder that has a wall portion, two attachment sections, and a knob member. The wall portion surrounds a hard disk drive. The two attachment sections are provided on the wall portion and are located away from each other. The knob member is attached to the two attachment sections. The knob member is s flexible member that is longer than a distance between the two attachment sections. The knob member includes a carved portion that is curved in such a manner as to swell in a direction away from the hard disk drive. The knob member is elastically deformable such that the swelling of the carved portion decreases. This permits the knob member to be provided on the holder with ease.

DETAILED DESCRIPTION OF THE PREFERRED EMBODIMENT

Figure 1:
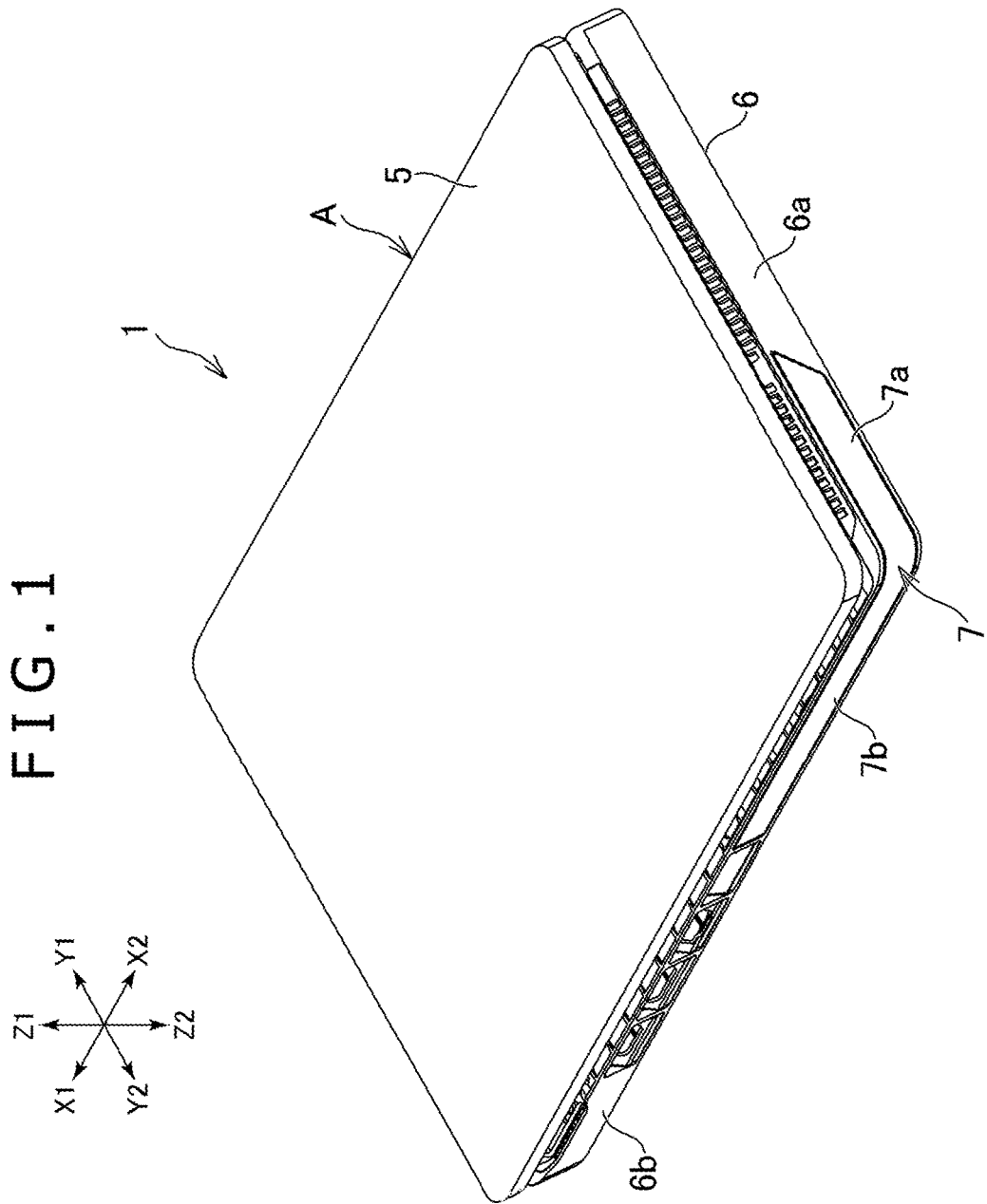
FIG. 1 is a perspective view of an electronic apparatus according to an embodiment of the present disclosure.
Figure 2:
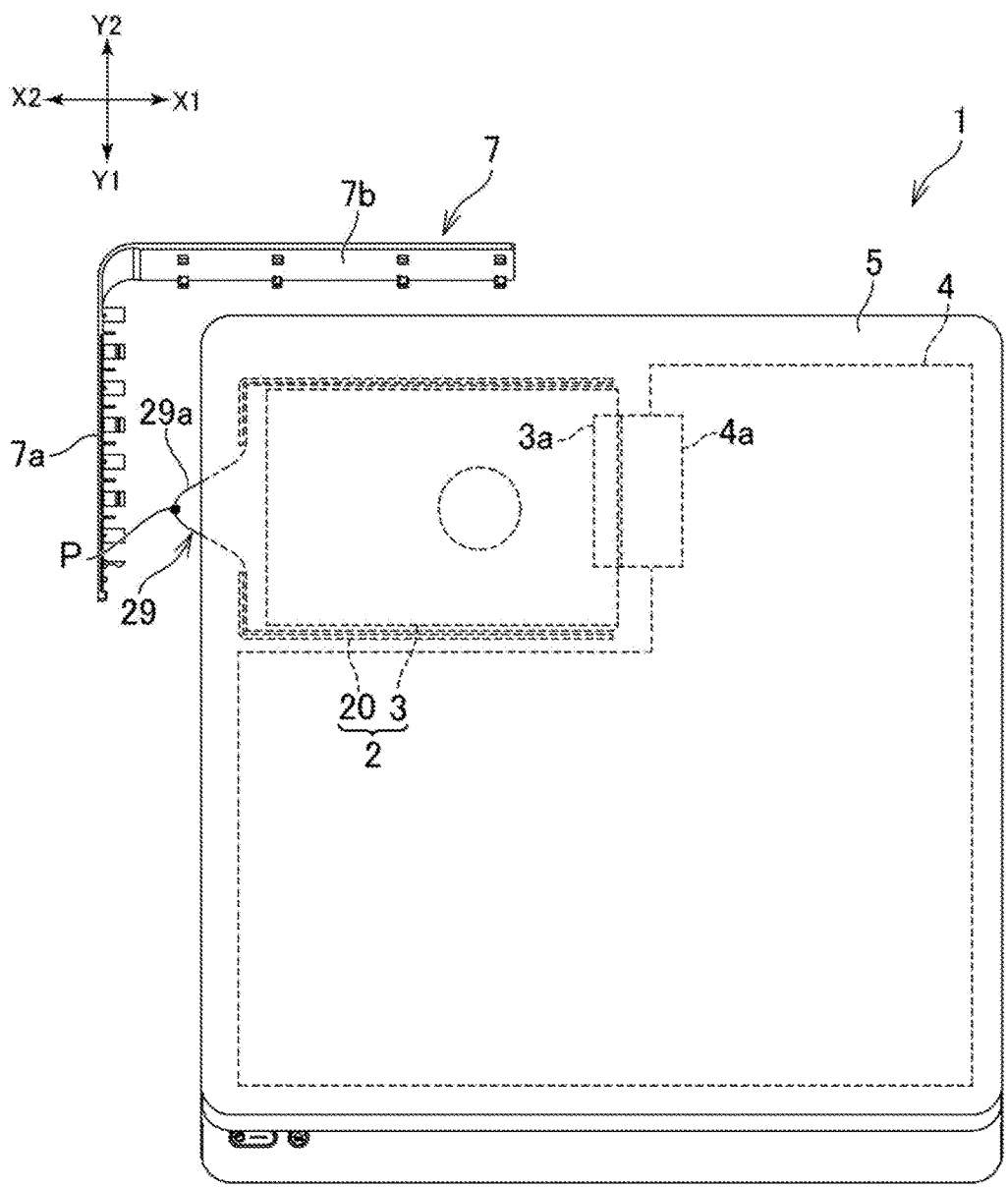
FIG. 2 is a plan view of the electronic apparatus.
Figure 3:
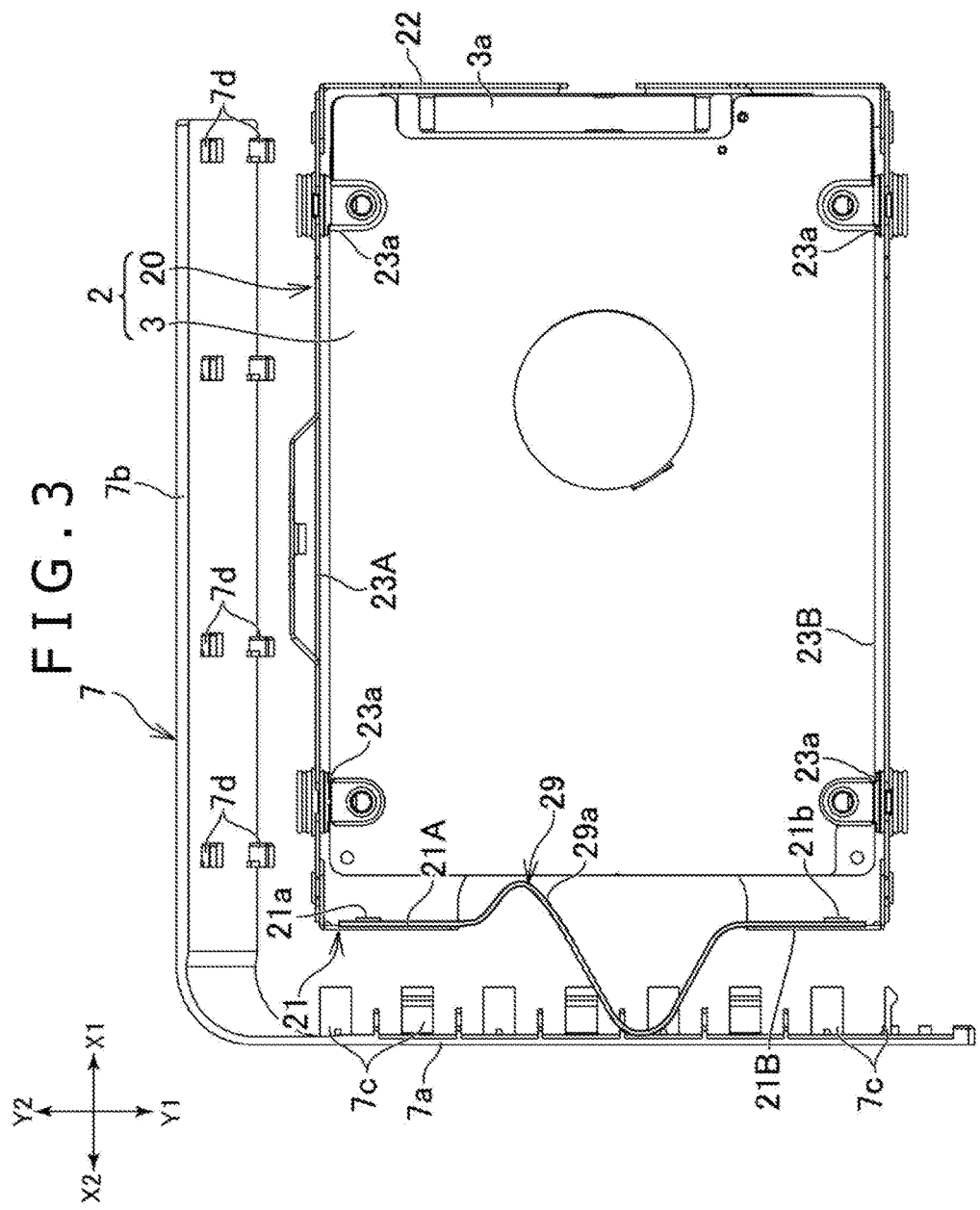
FIG. 3 is a plan view illustrating a positional relationship between a hard disk assembly and a part cover of the electronic apparatus.
Figure 4:
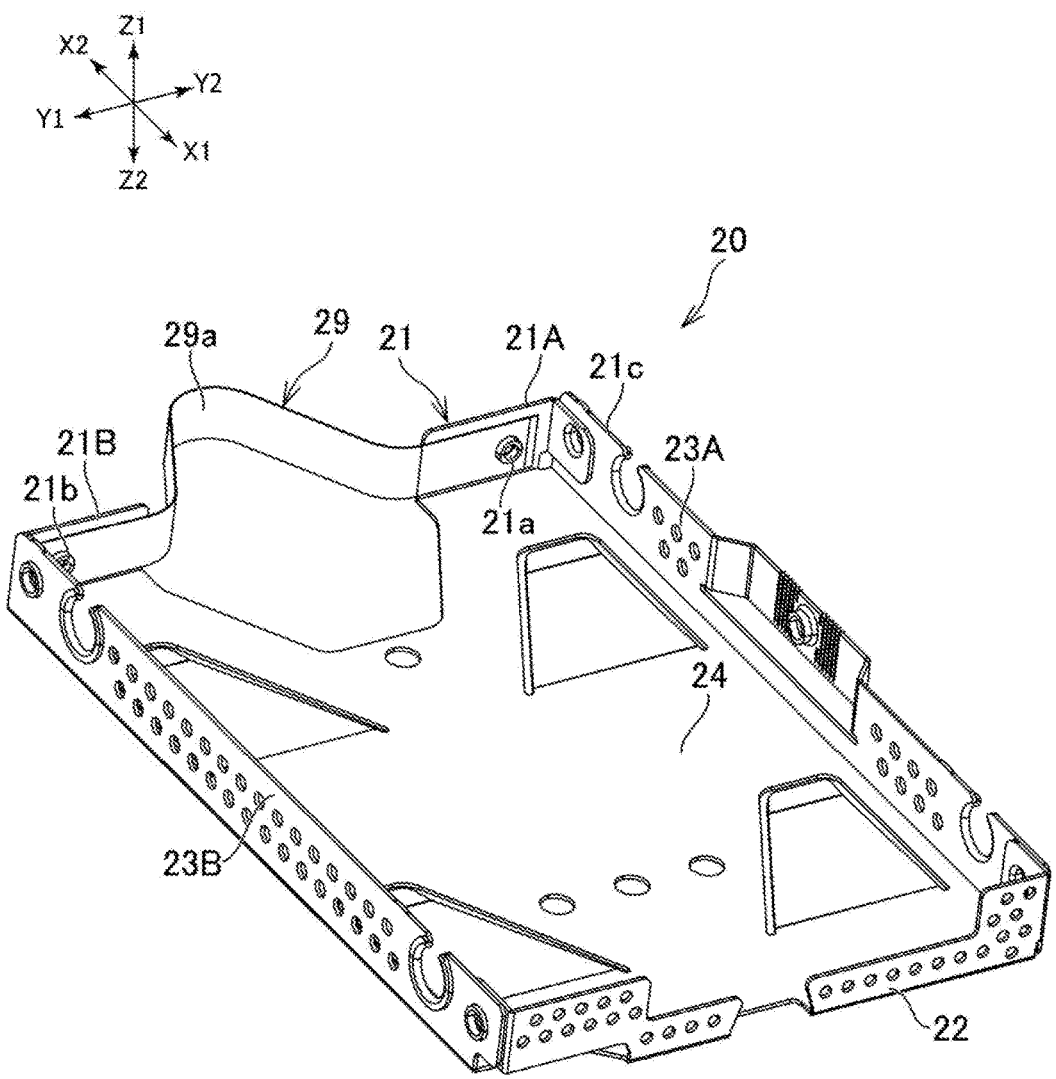
FIG. 4 is a perspective view of a holder making up the hard disk assembly.

A description will be given below of an embodiment of the present disclosure. FIG. 1 is a perspective view of an electronic apparatus 1 that is an example of the embodiment of the present disclosure. FIG. 2 is a plan view of the electronic apparatus 1. FIG. 3 is a plan view illustrating a positional relationship between a removable part and a part cover 7. The electronic apparatus 1 has, as an example of a part, a hard disk assembly 2 that includes a hard disk drive 3 and a holder 20. FIG. 4 is a perspective view of the holder 20. In the description given below, X1, X2, Y1, Y2, Z1, and Z2 shown in FIG. 1 will be referred to as rightward direction, leftward direction, frontward direction, rearward direction, upward direction, and downward direction, respectively.

The electronic apparatus 1 is an entertainment device that functions as a gaming device or an audio/visual apparatus, for example. The electronic apparatus 1 outputs movie data generated by execution of game programs, video and audio data acquired from storage media such as optical discs and/or video and audio data acquired via networks to a television set or other display device. The electronic apparatus 1 is not limited to an entertainment device such as gaming device and may be a personal computer.

As illustrated in FIG. 1, the electronic apparatus 1 has an exterior member A that makes up an outer surface of the electronic apparatus 1 and various parts accommodated in the exterior member A. In the example of the electronic apparatus 1, a circuit board 4, the hard disk assembly 2, and so on are accommodated in the exterior member A (refer to FIG. 2). The hard disk assembly 2 has the hard disk drive 3 and the holder 20 that holds the hard disk drive 3. The hard disk drive 3 stores programs executed by a microprocessor (not shown) mounted on the circuit board 4 and data used to execute the programs. The exterior member A has, for example, an upper cover 5 that covers an upper side of the circuit board 4 and other parts and a lower cover 6 that covers a lower side of the circuit board 4 and other parts.

A compartment is provided in a main body of the electronic apparatus 1 to accommodate the hard disk assembly 2. In the present specification, the "main body" of the electronic apparatus 1 is a portion other than the hard disk assembly 2. In the example of the electronic apparatus 1, a compartment is provided in a lower portion of the main body. An opening (compartment entrance) is formed in the lower cover 6 to expose the compartment. As illustrated in FIG. 1, the part cover 7 is attached to the lower cover 6 to close the opening. In the example of the electronic apparatus 1, the lower cover 6 is in the shape of a box that is open upward. The lower cover 6 has a bottom portion, a side wall portion 6a, and a rear wall portion 6b. The side wall portion 6a rises from a left edge and a right edge of the bottom portion. The rear wall portion 6b rises from a rear edge of the bottom portion. The opening for exposing the compartment is formed in a rear portion of the side wall portion 6a (more specifically, left wall portion). In the example of the electronic apparatus 1, therefore, the hard disk assembly 2 is inserted into the compartment by being slid to the right and drawn out of the compartment by being slid to the left. A compartment position and an insertion direction of the hard disk assembly 2 are not limited to those in the example of the electronic apparatus 1. For example, the compartment may be open on the rear of the electronic apparatus 1. In this case, the hard disk assembly 2 is inserted into the compartment by being slid forward.

As illustrated in FIG. 2, in the example of the electronic apparatus 1, the part cover 7 is approximately L-shaped. That is, the part cover 7 has a first plate portion 7a and a second plate portion 7b. The first plate portion 7a closes the opening formed in the lower cover 6. The second plate portion 7b connects to a rear end of the first plate portion 7a and is attached to a rear side of the rear wall portion 6b of the lower cover 6. The second plate portion 7b has engagement sections 7d (refer to FIG. 3) that catch in holes formed in the rear wall portion 6b of the lower cover 6. Also, the first plate portion 7a has engagement sections 7c (refer to FIG. 3) that catch on an edge of the opening of the lower cover 6. A shape of the part cover 7 is not limited to that in the example of the electronic apparatus 1. For example, the part cover 7 may have no second plate portion 7b.

As illustrated in FIG. 2, the circuit board 4 has a shape that avoids the position of the hard disk assembly 2 when seen in plan view. In the example of the electronic apparatus 1, the circuit board 4 is in the shape of a rectangle having a notched corner portion. The hard disk drive 3 has a connector section 3a at its end portion. A connector 4a connected to the connector section 3a of the hard disk drive 3 is mounted on the circuit board 4. The connector 4a is mounted on an edge of the circuit board 4. The connector 4a is located in an innermost portion of the compartment in the insertion direction of the hard disk assembly 2 (the rightward direction in the example of the electronic apparatus 1). Therefore, inserting the hard disk assembly 2 into the compartment by sliding the hard disk assembly 2 in the direction along the circuit board 4 automatically connects the connector section 3a of the hard disk drive 3 to the connector 4a.

As described above, the hard disk assembly 2 has the holder 20. As illustrated in FIG. 4, the holder 20 is in the shape of a box that is open upward. That is, the holder 20 has a bottom portion 24, a rear wall portion 21, and a front wall portion 22. The rear wall portion 21 is located on a rear side in the insertion direction of the hard disk assembly 2. The front wall portion 22 is located on a front side in the insertion direction. Also, the holder 20 has a side wall portion 23A and a side wall portion 23B that extend in the insertion direction and that are opposed to each other. The hard disk drive 3 is sandwiched between dampers 23a (refer to FIG. 3) attached to the side wall portion 23A and the dampers 23a (refer to FIG. 3) attached to the side wall portion 23B. The holder 20 is formed using a metal.

As illustrated in FIG. 4, a knob member 29 is provided on the hard disk assembly 2. The knob member 29 is a member in a tape form or in a wire form. In the example of the electronic apparatus 1, the knob member 29 is in a tape form. That is, the knob member 29 is a member having a width (vertical width in the example of the electronic apparatus 1) greater than a thickness. The knob member 29 may be in a wire form having a circular or rectangular cross-section.

The knob member 29 is attached to the holder 20. Specifically, as illustrated in FIG. 4, two attachment sections 21a and 21b located away from each other are provided on the holder 20. The knob member 29 is attached to the attachment section 21a and the attachment section 21b. The knob member 29 is a flexible member that is longer than a distance between the attachment section 21a and the attachment section 21b (length of a straight line connecting the attachment section 21a and the attachment section 21b). For this reason, the knob member 29 is attached to the attachment section 31a and the attachment section 21b in a curved fashion. Here, flexibility refers to a property of the knob member 29 to warp when a force is applied to the knob member 29.

As illustrated in FIG. 4, the knob member 29 has, between the attachment section 21a and the attachment section 21b, a curved portion 29a that is curved in such a manner as to swell in a direction away from the hard disk assembly 2. In other words, the curved portion 29a of the knob member 29 is curved in such a manner as to swell in a direction opposite to the insertion direction of the hard disk assembly 2 (the leftward direction in the example of the electronic apparatus 1). The curved portion 29a is in the approximate shape of a U that is open in the insertion direction of the hard disk assembly 2. The curved portion 29a is elastically deformable such that the swelling of the curved portion 29a in a direction away from the hard disk assembly 2 decreases. That is, the curved portion 29a is elastically deformable such that the swelling in the direction opposite to the insertion direction decreases. For this reason, even when other part or member of the electronic apparatus 1 comes into contact with the curved portion 29a, the curved portion 29a elastically deforms, making it easy to provide the knob member 29 on the hard disk assembly 2. Thus, the elastically deformable knob member 29 is formed using plastic such as polyethylene terephthalate (PET). The knob member 29 may also be a thin piece or metal.

As described above, the electronic apparatus 1 has the part cover 7 that is attached to the lower cover 6 to close the opening of the compartment. FIG. 3 illustrates a positional relationship between the part cover 7 that closes the opening of the compartment and the hard disk assembly 2. As illustrated in this figure, the curved portion 29a of the knob member 29 is accommodated in the electronic apparatus 1 in a manner elastically deformed such that the swelling of the curved portion 29a (swelling (to the left) in the direction opposite to the insertion direction of the hard disk assembly 2) decreases. That is, the curved portion 29a of the knob member 29 is accommodated on the inner side of the part cover 7 in an elastically deformed manner such that the swelling of the curved portion 29a decreases by being pressed by the part cover 7. The part cover 7 is attached to the lower cover 6 while resisting an elastic force of the curved portion 29a. For this reason, when the part cover 7 is removed from the lower cover 6 as illustrated in FIG. 2, the curved portion 29a swells in the direction away from the hard disk assembly 2 by the elastic force of the curved portion 29a. That is, the curved portion 29a swells in the direction opposite to the insertion direction of the hard disk assembly 2 by the elastic force and is restored to its initial shape (shape illustrated in FIG. 4).

As illustrated in FIG. 2, when the part cover 7 is removed from the exterior member A, that is, when the part cover 7 is removed from the lower cover 6, the curved portion 29a of the knob member 29 swells outward beyond the exterior member A. In the example of the electronic apparatus 1, when the part cover 7 is removed from the lower cover 6 with the connector section 3a of the hard disk drive 3 connected to the connector 4a of the circuit board 4, that is, which the hard disk drive 3 located at a proper position, the curved portion 29a swells outward beyond the lower cover 6. Going into details, when the electronic apparatus 1 is seen in plan view, at least a summit portion P of the curved portion 29a is located more outward (leftward) than the side wall portion 6a of the lower cover 6. This structure gives service personnel easy access to the curved portion 29a when the part cover 7 is removed, contributing to improved workability in drawing out the hard disk assembly 2.

As illustrated in FIG. 4, in the example of the electronic apparatus 1, the attachment section 21a and the attachment section 21b are provided on the rear wall portion 21 of the holder 20. Going into details, the attachment section 21a and the attachment section 21b are provided on an inner surface of the rear wall portion 21, and both end portions of the knob member 29 are arranged along the inner surface of the rear wall portion 21. The rear wall portion 21 is a wall portion located on the rear side in the insertion direction of the hard disk assembly 2 as described above. When the hard disk assembly 2 is drawn out of the compartment using the knob member 29, a force acting on the knob member 29 from the attachment section 21a and the attachment section 21b provided on the inner surface of the rear wall portion 21 is exerted along the rear wall portion 21. On the other hand, if the knob member 29 is attached to attachment sections provided on an outer surface of the rear wall portion 21, the force acting on the knob member 29 from the attachment sections is exerted perpendicular to the rear wall portion 21. Therefore, the structure having the attachment section 21a and the attachment section 21b on the inner surface of the rear wall portion 21 contributes to improved strength of the knob member 29 against tensile force applied to the knob member 29 as compared to the structure having the attachment section 21a and the attachment section 21b on the outer surface of the rear wall portion 21. It should be noted that positions of the attachment section 21a and the attachment section 21b are not limited, to those in the example of the electronic apparatus 1. For example, the attachment section 21a and the attachment section 21b may be provided on the side wall portion 23A and the side wall portion 23B of the holder 20, respectively. In this case, the attachment section 21a and the attachment section 21b may be provided on outer surfaces of the side wall portion 23A and the side wall portion 23B.

The knob member 29 is attached to the attachment section 21a and the attachment section 21b, for example, by swaging. That is, the attachment section 21a and the attachment section 21b are formed in a tubular shape, and holes are formed in the knob member 29. The attachment section 21a and the attachment section 21b are fitted in the holes of the knob member 29. Then, the knob member 29 is fastened to the attachment section 21a and the attachment section 21b by deforming end portions of the attachment section 21a and the attachment section 21b into a flange shape. An attachment structure of the knob member 29 is not limited to that in the example of the electronic apparatus 1. For example, the knob member 29 may be attached to the holder 20 by using fastening tools such as screws and bolts.

As illustrated in FIG. 4, in the example of the electronic apparatus 1, the rear wall portion 21 of the holder 20 includes a first wall portion 21A and a second wall portion 21B. The first wall portion 21A and the second wall portion 21B are located away from each other in a direction orthogonal to the insertion direction of the hard disk assembly 2 (front-rear direction in the example of the electronic apparatus 1). The attachment section 21a and the attachment section 21b are provided on the first wall portion 21A and the second, wall portion 21B, respectively. The knob member 29 extends from the attachment section 21a and the attachment section 21b toward inner sides of the first wall portion 21A and the second wall portion 21B. The curved portion 29a of the knob member 29 is located between the first wall portion 21A and the second wall portion 21B and swells in the direction opposite to the insertion direction of the hard disk assembly 2, that is, in the direction away from the hard disk drive 3.

As illustrated in FIG. 4, the first wall portion 21A and the second wall portion 21B of the rear wall portion 21 are located away from each other. For this reason, the hard disk drive 3 is exposed between the first wall portion 21A and the second wall portion 21B in the direction opposite to the insertion direction. This structure of the rear wall portion 21 of the holder 20 allows service personnel to directly push the hard disk drive 3 when inserting the hard disk assembly 2 into the compartment of the electronic apparatus 1. As a result, the connector section 3a of the hard disk drive 3 can be smoothly connected to the connector 4a of the circuit board 4. It should be noted that the structure of the holder 20 is not limited to that in the example of the electronic apparatus 1. For example, it is not necessary for the rear wall portion 21 to have the first wall portion 21A and the second wall portion 21B that are located away from each other. In other words, the first wall portion 21A and the second wall portion 21B may be connected. In this case, the knob member 29 may extend from the attachment section 21a and the attachment section 21b beyond an upper edge of the rear wall portion 21 in the direction opposite to the insertion direction of the hard disk assembly 2.

As illustrated in FIG. 4, the first wall portion 21A and the second wall portion 21B of the holder 20 are connected to the side wall portion 23A and the side wall portion 23B, respectively. That is, each of the first wall portion 21A and the second wall portion 21B has a bending portion 21c at its end portion. The bending portions 21c are fastened to the side wall portion 23A and the side wall portion 23B. This structure keeps to a minimum warping of the first wall portion 21A and the second wall portion 21B when the knob member 29 is pulled in the direction opposite to the insertion direction of the hard disk assembly 2.

As described above, the electronic apparatus 1 has the compartment, the part (specifically, the hard disk assembly 2), the attachment section 21a, the attachment section 21b, and the knob member 29. The compartment is provided in the main body or the electronic apparatus 1. The part is accommodated in the compartment and can be drawn out of the compartment. The attachment section 21a and the attachment section 21b are provided on the part and are located away from each other. The knob member 29 is attached to the attachment section 21a and the attachment section 21b and is a flexible member that is longer than the distance between the attachment section 21a and the attachment section 21b. The knob member 29 has the curved portion 29a that is curved in such a manner as to swell in the direction away from the part. The knob member 29 is elastically deformable such that the swelling of the curved portion 29a decreases. This structure causes the curved portion 29a to elastically deform even when other part or member of the electronic apparatus 1 comes into contact with the curved portion 29a. As a result, it is easy to provide the knob member 29 on the removable part.

Also, the holder 20 has the rear wall portion 21, the front wall portion 22, the side wall portions 23, the attachment section 21a, the attachment section 21b, and the knob member 29. The rear wall portion 21, the front wall portion 22, and the side wall portions 23 surround the hard disk drive 3. The attachment section 21a and the attachment section 21b are provided on the rear wall portion 21 and located away from each other. The knob member 29 is attached to the attachment section 21a and the attachment section 21b. The knob member 29 is a flexible member that is longer than the distance between the attachment section 21a and the attachment section 21b. The knob member 29 has the curved portion 29a that is curved in such a manner as to swell in the direction away from the hard disk drive 3. The knob member 29 is elastically deformable such that the swelling of the curved portion 29a decreases. This structure makes it easy to provide the knob member 29 on the holder 20.

The present disclosure is not limited to the electronic apparatus 1 and the holder 20 described above and may be modified, in various ways.

For example, the part that can be removed from the main body of the electronic apparatus 1 is not typically limited to the hard disk assembly 2. For example, if the electronic apparatus 1 is a mobile terminal, the electronic apparatus 1 may have a battery as a part that can be removed from the main body of the electronic apparatus 1. In this case, a plate-shaped member such as a holder that surrounds the battery may be attached to the battery so that the knob member 29 is attached to this holder.

Also, the electronic apparatus 1 may have an optical disc drive as a part that can be removed from the main body of the electronic apparatus 1. For example, the electronic apparatus 1 may have an enclosure having a rack so that the optical disc drive can be inserted into the rack. In this case, the knob member 29 may be provided on this optical disc drive. The knob member 29 may be attached to the rear side in the insertion direction of the optical disk drive. Alternatively, the knob member 29 may be attached to a side surface of the optical disc drive.

Also, the electronic apparatus 1 may be a television set. A television set has a relatively large housing. Therefore, if the electronic apparatus 1 has a relatively large housing as does a television set, the knob member 29 may be accommodated in the electronic apparatus 1 with the curved portion 29a swelling. That is, the knob member 29 may be accommodated in the electronic apparatus 1 with the curved portion 29a not elastically deformed such that the swelling of the curved portion 29a decreases.

Also, the electronic apparatus 1 may do without the part cover 7. The curved portion 29a of the knob member 29 may be accommodated in the housing of the electronic apparatus 1 in a manner pressed by the housing of the electronic apparatus 1 and elastically deformed.

Also, the part to which the knob member 29 is attached (holder 20 in the example of the electronic apparatus 1) may be formed using plastic. In this case, the knob member 29 may be welded to the attachment section 21a and the attachment section 21b provided on the plastic.

The present disclosure contains subject matter related to that disclosed in Japanese Priority Patent Application JP 2016-150625 filed in the Japan Patent Office on Jul. 29, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. An electronic apparatus comprising:
a main body;
a compartment provided in the main body;
a part that is accommodated in the compartment and that can be drawn out of the compartment;
two attachment sections that are provided on the part and that are located away from each other, where the cart upon which the attachment sections are provided is shaped to form a first plane; and
a first knob member attached to the two attachment sections, wherein
the first knob member is a flexible member that is longer than a distance between the two attachment sections, includes a curved portion that is curved in such a manner as to swell in a direction away from the part, and is elastically deformable such that the swelling of the curved portion decreases; and
wherein the first knob member is configured to, when a force is applied to the first knob member, flex in a first direction which is on a first side of the first plane, and flex to form a second knob member which is in addition to the first knob member, the second knob member being smaller than the first knob member.

2. The electronic apparatus of claim 1, wherein
the curved portion of the knob member is accommodated in the electronic apparatus in a manner elastically deformed such that the swelling of the curved portion decreases.

3. The electronic apparatus of claim 2, further comprising:
a part cover configured to close the compartment, wherein
the curved portion of the knob member is accommodated on an inner side of the part cover in a manner pressed by the part cover and elastically deformed such that the swelling of the curved portion decreases.

4. The electronic apparatus of claim 3, wherein
the main body has an exterior member in which an opening is formed to expose the compartment,
the part cover is attached to the exterior member to close the opening, and
when the part cover is removed from the exterior member of the main body, the curved portion of the knob member swells outward beyond the exterior member.

5. The electronic apparatus of claim 1, wherein
the part has a wall portion, and
the two attachment sections are provided on an inner surface of the wall portion.

6. The electronic apparatus of claim 5, wherein
the part has a device and a holder that holds the device and has the wall portion,
the wall portion has a first wall portion on which first one of the two attachment sections is provided and a second wall portion on which second one of the two attachment sections is provided, and
the device is exposed between the first wall portion and the second wall portion.

7. The electronic apparatus of claim 6, wherein
the curved portion of the knob member swells in a direction away from the part between the first wall portion and the second wall portion.

8. A hard disk drive holder comprising:
a wall portion that surrounds a hard disk drive;
two attachment sections that are provided on the wall portion and are located away from each other, where the wall portion upon which the attachment sections are provided are co-planar in a first plane; and a first knob member attached to the two attachment sections, wherein the first knob member is a flexible member that is longer than a distance between the two attachment sections, includes a curved portion that is curved in such a manner as to swell in a direction away from the hard disk drive, and is elastically deformable such that the swelling of the curved portion decreases; and wherein the first knob member is configured to, when a force is applied to the first knob member, flex in a first direction which is on a first side of the first plane, and flex to form a second knob member which is in addition to the first knob member, the second knob member being smaller than the first knob member.

* * * * *